United States Patent
Huang et al.

(10) Patent No.: US 11,636,336 B2
(45) Date of Patent: Apr. 25, 2023

(54) TRAINING DEVICE AND TRAINING METHOD FOR NEURAL NETWORK MODEL

(71) Applicant: Industrial Technology Research Institute, Hsinchu (TW)

(72) Inventors: Mao-Yu Huang, Yunlin County (TW); Po-Yen Hsieh, Taichung (TW); Chih-Neng Liu, Tainan (TW); Tsann-Tay Tang, Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 415 days.

(21) Appl. No.: 16/729,453

(22) Filed: Dec. 29, 2019

(65) Prior Publication Data

US 2021/0174200 A1    Jun. 10, 2021

(30) Foreign Application Priority Data

Dec. 4, 2019  (TW) ................. 108144234

(51) Int. Cl.
*G06N 3/08*       (2023.01)
*G01N 21/956*   (2006.01)
*G06T 7/00*       (2017.01)
*G06N 3/045*     (2023.01)

(52) U.S. Cl.
CPC .............. *G06N 3/08* (2013.01); *G01N 21/956* (2013.01); *G06N 3/045* (2023.01); *G06T 7/001* (2013.01); *G01N 2021/95646* (2013.01); *G06T 2207/30148* (2013.01); *G06T 2207/30152* (2013.01)

(58) Field of Classification Search
CPC ....... G01N 21/956; G01N 2021/95646; G01N 2021/8883; G01N 2201/1296; G06T 2207/30148; G06T 2207/30152; G06T 2207/30141; G06T 7/001; G06T 2207/20081; G06T 2207/20084;
(Continued)

(56) References Cited

U.S. PATENT DOCUMENTS 7,613,663 B1    11/2009  Commons et al.
8,065,244 B2    11/2011  Chen et al.
10,169,715 B2    1/2019  Dirac et al.
(Continued)

FOREIGN PATENT DOCUMENTS

CN    105205504    12/2015
CN    108595558    9/2018
(Continued)

OTHER PUBLICATIONS

"Office Action of Taiwan Counterpart Application", dated Nov. 27, 2020, p. 1-p. 6.
(Continued)

*Primary Examiner* — Boubacar Abdou Tchoussou
(74) *Attorney, Agent, or Firm* — JCIPRNET (57) ABSTRACT

A training device and a training method for a neural network model. The training method includes: obtaining a data set; completing, according to the data set, a plurality of artificial intelligence (AI) model trainings to generate a plurality of models corresponding to the plurality of AI model trainings respectively; selecting, according to a first constraint, a first model set from the plurality of models; and selecting, according to a second constraint, the neural network model from the first model set.

18 Claims, 1 Drawing Sheet

(58) Field of Classification Search
CPC ...... G06N 3/08; G06N 3/0454; G06N 3/0445; G06N 3/02
See application file for complete search history.

(56) References Cited

U.S. PATENT DOCUMENTS

| | | | |
|---|---|---|---|
| 10,963,753 B2* | 3/2021 | Kumar | G06N 20/00 |
| 10,963,990 B2* | 3/2021 | Kumar | G06T 7/62 |
| 11,200,659 B2* | 12/2021 | Bidault | G06K 9/6271 |
| 11,227,193 B2* | 1/2022 | Kumar | G06T 5/002 |
| 2009/0106178 A1 | 4/2009 | Chu | |
| 2010/0198054 A1 | 8/2010 | Ewing et al. | |
| 2011/0231256 A1 | 9/2011 | Wang et al. | |
| 2017/0286830 A1 | 10/2017 | El-Yaniv et al. | |
| 2018/0144261 A1 | 5/2018 | Wnuk et al. | |
| 2019/0102700 A1* | 4/2019 | Babu | G06N 5/025 |
| 2019/0258904 A1 | 8/2019 | Ma et al. | |
| 2020/0034665 A1* | 1/2020 | Ghanta | G06N 20/00 |
| 2020/0242733 A1* | 7/2020 | Kumar | G06T 7/62 |
| 2021/0019662 A1* | 1/2021 | Wray | G06N 20/20 |
| 2021/0042570 A1* | 2/2021 | Iskandar | G06K 9/6228 |
| 2021/0150696 A1* | 5/2021 | Bidault | G06N 3/04 |
| 2021/0201147 A1* | 7/2021 | Tu | G06N 3/0454 |
| 2021/0374403 A1* | 12/2021 | Yumiba | G06V 10/82 |
| 2022/0198336 A1* | 6/2022 | Puente Pestaña | G06N 20/00 |

FOREIGN PATENT DOCUMENTS

| | | |
|---|---|---|
| CN | 108712809 | 10/2018 |
| CN | 109376615 | 2/2019 |
| CN | 110059484 | 7/2019 |
| CN | 110134947 | 8/2019 |
| EP | 3515293 | 7/2019 |
| TW | I649699 | 2/2019 |
| TW | 201918939 | 5/2019 |
| TW | I667575 | 8/2019 |
| TW | 201945861 | 12/2019 |
| WO | 2007147166 | 12/2007 |
| WO | 2018213205 | 11/2018 |

OTHER PUBLICATIONS

Ben Taylor, et al., "Adaptive deep learning model selection on embedded systems." LCTES 2018, Jun. 19-20, 2018, pp. 31-43.

Salman H. Khan, et al., "Cost-Sensitive Learning of Deep Feature Representations From Imbalanced Data." IEEE Transactions on Neural Networks and Learning Systems, vol. 29, No. 8, Aug. 2018, pp. 3573-3587.

Xinyue Zhu, et al., "Emotion Classification with Data Augmentation Using Generative Adversarial Networks." arXiv:1711.00648 [cs.CV], Dec. 14, 2017, pp. 1-14.

Nikolaos Sarafianos, et al., "Deep Imbalanced Attribute Classification using Visual Attention Aggregation." EECV 2018, Sep. 2018, pp. 1-18.

Chen Huang, et al., "Learning Deep Representation for Imbalanced Classification." 2016 IEEE Conference on Computer Vision and Pattern Recognition, Jun. 27-30, 2016, pp. 5375-5384.

Hansang Lee, et al., "Plankton classification on imbalanced large scale database via convolutional neural networks with transfer learning." 2016 IEEE International Conference on Image Processing, Sep. 25-28, 2016, pp. 3713-3717.

* cited by examiner

TRAINING DEVICE AND TRAINING METHOD FOR NEURAL NETWORK MODEL

CROSS-REFERENCE TO RELATED APPLICATION

This application claims the priority benefit of Taiwan application Ser. No. 108144234, filed on Dec. 4, 2019. The entirety of the above-mentioned patent application is hereby incorporated by reference herein and made a part of this specification.

BACKGROUND

Technical Field

The disclosure relates to a training device and a training method for a neural network model.

Description of Related Art

In the industry, when artificial intelligence is applied to perform automated optical inspection (AOI), performance of a trained neural network may be poor when the number of defective images in training data is far less than the number of normal images. On the other hand, when several types of defects are present, excessively uneven distribution of numbers of these types of defective images may cause the trained neural network to inaccurately identify the defects of each type as well.

In the existing neural network training methods, an appropriate model is usually selected according only to a single constraint. For example, the optimal neural network model is determined according to a minimum error rate corresponding to a validation data set. Such training method cannot effectively solve the above problem. Therefore, it is one of the goals of those skilled in the art to provide a method that can select the most appropriate neural network model from a plurality of neural network models.

SUMMARY

The disclosure is directed to a training device and a training method for a neural network model capable of selecting a suitable (for example, providing favorable average performance for identifying various types of defects) model through multiple constraints to act as a finally used neural network model when a distribution of numbers of various types of defective images in a training data set is excessively uneven.

The disclosure provides a training device for a neural network model including a processor, a storage medium, and a transceiver. The storage medium stores a plurality of modules. The processor is coupled to the storage medium and the transceiver and accesses and executes the modules. The modules include a data collection module and a training module. The data collection module obtains a data set through the transceiver. The training module completes a plurality of artificial intelligence (AI) model trainings according to the data set to generate a plurality of models corresponding to the plurality of AI model trainings respectively, selects a first model set from the plurality of models according to a first constraint, and selects the neural network model from the first model set according to a second constraint.

The disclosure provides a training method for a neural network model, and the method includes the following steps. A data set is obtained. A plurality of artificial intelligence (AI) model trainings are completed according to the data set to generate a plurality of models corresponding to the plurality of AI model trainings respectively. A first model set is selected from the plurality of models according to a first constraint. The neural network model is selected from the first model set according to a second constraint.

Based on the above description, when the distribution of numbers of various types of images in the data set is excessively uneven, the model selected according to the multiple constraint selecting method provided by the disclosure provides more favorable identification performance than the model selected according only to a single constraint.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

The disclosure provides a training device and a training method for a neural network model capable of selecting a suitable (for example, providing favorable average performance for identifying various types of defects) model through multiple constraints to act as a finally used neural network model when a distribution of numbers of various types of defective images in a training data set is excessively uneven.

Figure 1:
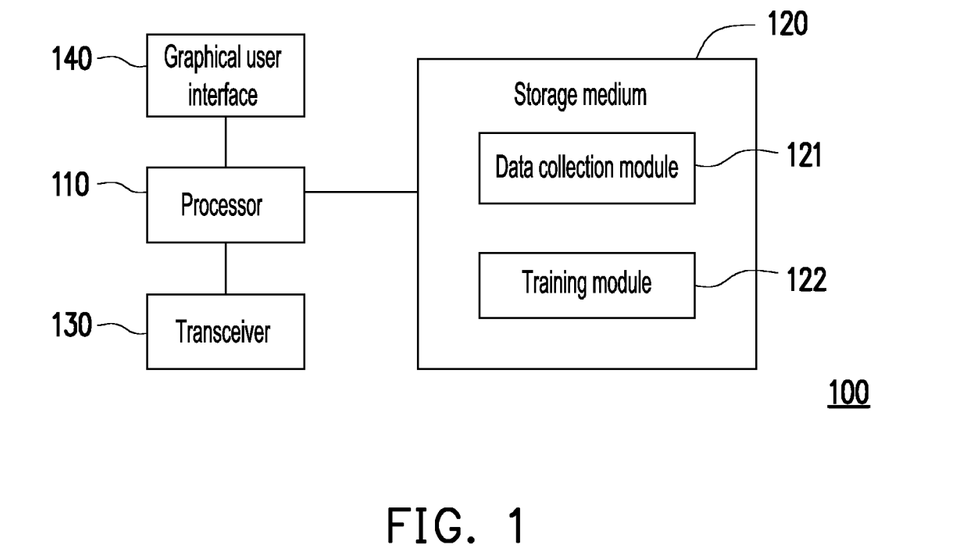
FIG. 1 is a schematic view of a training device for a neural network model according to an embodiment of the disclosure.

FIG. 1 is a schematic view of a training device 100 for a neural network model according to an embodiment of the disclosure. The training device 100 may include a processor 110, a storage medium 120, and a transceiver 130. In one embodiment, the training device 100 may further include a graphical user interface (GUI) 140.

The processor 110 is coupled to the storage medium 120 and the transceiver 130 and is configured to access and execute a plurality of modules stored in the storage medium 120. The processor 110 is, for example, a central processing unit (CPU), or a programmable micro control unit (MCU) of a general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar devices or a combination of the above devices.

The storage medium 120 is, for example, any type of a fixed or movable random access memory (RAM), a read-only memory (ROM), a flash memory, a hard disk drive (HDD), a register, a solid state drive (SSD), or a similar device or a combination of the above devices. The storage medium 120 is configured to store a plurality of modules or various applications that may be executed by the processor 110. In the embodiment, the storage medium 120 may store a plurality of modules including a data collection module 121, a training module 122, etc., and functions of the modules are to be described later.

The transceiver 130 transmits and receives signals in a wireless or wired manner. The transceiver 130 may also perform operations such as low noise amplification, impedance matching, frequency mixing, up or down frequency conversion, filtering, amplification, and other similar operations.

The GUI 140 is an input device which may receive an operation from the user and generate a command corresponding to the operation. After generating the command, the GUI 140 may transmit the command to the processor.

In the embodiment, the data collection module 121 may obtain a data set used for training the neural network model through the transceiver 130. After the data collection module 121 obtains the data set, the training module 122 may complete a plurality of artificial intelligence (AI) model trainings according to the data set. One AI model training is, for example, an iteration in the process of training an AI model. To be specific, the training module 122 may treat the data set as training data to complete iterations again and again according to a neural network algorithm (or a machine learning algorithm) and the training data, so that an output of each iteration is gradually converged toward a target function. When each of the iterations is completed, the training module 122 may generate a model corresponding to such iteration. For example, if the training module 122 treats the data set obtained by the data collection module 121 as the training data and completes $10^6$ iterations according to the training data and the neural network algorithm, the training module 122 generates $10^6$ models corresponding to each of the iterations respectively. The training module 122 may select the model providing most favorable performance (for example, providing a lowest error rate) from these models (i.e., the $10^6$ models) to act as a neural network model. In an embodiment, the training module 122 may output the neural network model through the transceiver 130 for users to use the neural network model to perform object recognition.

For example, the neural network model outputted by the training module 122 may be used to identify appearance defects of a printed circuit board (PCB) or a semiconductor manufacturing wafer (e.g., a dynamic random access memory (DRAM)). In this way, the data set acting as the training data may be, for example, image data of an appearance of a DRAM or a wafer to be inspected obtained by an automated optical inspection (AOI) device or image data of an appearance of the PCB obtained by an automated visual inspection (AVI) device, but the disclosure is not limited thereto. On the other hand, the neural network model, for example, includes an autoencoder neural network, a deep learning neural network, a deep residual learning neural network, and a restricted Boltzmann machine (RBM) neural network, a recursive neural network, or a multilayer perception (MLP) neural network, etc., but the disclosure is not limited thereto.

The training module 122 may select a specific model from a plurality of models respectively corresponding to the iterations as a neural network model through a plurality of constraints. In an embodiment, the training module 122 may select the model acting as the neural network model according to two constraints (referred to as a "constraint A" and a "constraint B" hereinafter). To be specific, the training module 122 may select a first model set from the plurality of models respectively corresponding to the iterations according to the constraint A (or referred to as a "first constraint"), where the first model set includes one or more first models complied with the constraint A. Then, the training module 122 may select a specific model that is complied with the constraint A and the constraint B (or referred to as a "second constraint") from the first model set to act as the neural network model to be finally used according to the constraint B. The aforementioned constraint A and constraint B are associated with at least one of: a true negative rate (TNR), a true positive rate (TPR), a false negative rate (FNR), a false positive rate (FPR), a minimum error rate, an average error rate, a recall rate, or accuracy, but the disclosure is not limited thereto. For example, the constraint A and the constraint B may be associated with any indicator related to a confusion matrix.

Since there may be plural models that are complied with the constraint A, the first model set selected by the training module 122 according to the constraint A includes plural first models that are complied with the constraint A. In order to find the best model to act as the neural network model to be finally used, in an embodiment, the training module 122 may select a specific model corresponding to a target condition from the first model set (i.e., a set of models complied with the constraint A) to serve as the neural network model to be finally used according to the constraint B. For example, it is assumed that the target function is TNR, the training module 122 may select a specific model with the largest TNR from the first model set to act as the neural network model to be finally used.

In another embodiment, the training module 122 may select a model corresponding to the last iteration and complied with the constraint B from the first model set (i.e., a set of models complied with the constraint A) according to the constraint B to act as the neural network model to be finally used. For example, it is assumed that the first model set includes a model X corresponding to a $10^{4th}$ iteration, a model Y corresponding to a $10^{5th}$ iteration, and a model Z corresponding to a $10^{6th}$ iteration. The training module 122 may then select the model Z to act as the neural network model to be finally used in response to the last iteration corresponding to the model Z.

The training device 100 may also train the neural network model based on more than two types of constraints. In an embodiment, the training module 122 may select the model acting as the neural network model according to three types of constraints (referred to as a "constraint X", a "constraint Y", and a "constraint Z" hereinafter). To be specific, the training module 122 may select the first model set from a plurality of models respectively corresponding to the iterations according to the constraint X (or referred to as a "first constraint X"). The first model set includes one or a plurality of first models that are complied with the constraint X. Then, the training module 122 may select a second model set from the first model set according to the constraint Y (or referred to as a "third constraint"). The second model set includes one or a plurality of second models that are complied with the constraint X and the constraint Y. Finally, the training module 122 may select a specific model that is complied with the constraint X, the constraint Y, and the constraint Z from the second model set to act as the neural network model to be finally used according to the constraint Z (or referred to as a "second constraint").

Types of the constraints and a number of the constraints used by the training module 122 for screening the models may be adjusted according to needs of a user, which are not limited by the disclosure.

In an embodiment, the data collection module 121 obtains the image data set related to the appearance of the PCB through the transceiver 130, and the training module 122 trains a neural network model that may be used to identify soldering defects of the PCB according to the image data set. A following table 1 shows numbers of soldering defect samples and normal samples in the image data set related to the appearance of the PCB.

TABLE 1

Image data set

|  | Training data | Validation data | Test data | Total |
|---|---|---|---|---|
| Defect | 20 | 5 | 24 | 49 |
| Normal | 2,438 | 605 | 3,022 | 6,065 |
| Total | 2,458 | 610 | 3,046 | 6,114 |
| Normal: defect | 121.90 | 121.00 | 125.92 | 123.78 |

According to table 1, it is known that the samples corresponding to the soldering defects in the image data set of the PCB appearance is far less than the normal samples. Therefore, if the conventional neural network training method is used to train the neural network model by using a single constraint, the performance of the trained neural network model may not be balanced. For example, the following table 2 and table 3 show the performance of the neural network model trained according to the training data in table 1 based on the single constraint "minimum error rate". When the user uses the validation data shown in table 1 to verify the neural network model, the performance of the neural network model is shown in table 2. When the user uses the test data shown in table 1 to test the neural network model, the performance of the neural network model is shown in table 3.

TABLE 2

| Overall accuracy (%) | Overall error rate (%) | Validation data as shown in table 1 Prediction of neural network model | | | |
|---|---|---|---|---|---|
| 99.67 | 0.33 | | Defect | Normal | Total | FNR (%): |
| True value (ground truth) | Defect | 3 | 2 | 5 | 40.00 |
| | Normal | 0 | 605 | 605 | TNR (%): |
| Total | | 3 | 607 | 610 | 100.00 |

TABLE 3

| Overall accuracy (%) | Overall error rate (%) | Test data shown in table 1 Prediction of neural network model | | | |
|---|---|---|---|---|---|
| 99.77 | 0.23 | | Defect | Normal | Total | FNR (%): |
| True value | Defect | 17 | 7 | 24 | 29.17 |
| | Normal | 0 | 3,021 | 3,021 | TNR (%): |
| Total | | 17 | 3,028 | 3,045 | 100.00 |

Generally, when the value of the TNR increases, the performance of the neural network model improves, and when the value of the FNR decreases, the performance of the neural network model improves. As shown in table 2 and table 3, the TNR of the neural network model trained based on the single constraint "minimum error rate" and the training data in table 1 may reach 100%, but comparatively, the FNR of the neural network model may reach 40%. In other words, the TNR performance of the neural network model is favorable, but the FNR performance of the neural network model is excessively unfavorable. Therefore, the performance of the neural network model on the TNR and the FNR is not balanced.

In an embodiment, if there is an excessively great difference in the class distributions between the detect samples (for example: soldering defect samples) and the normal samples, that is, the number of the defect samples is far less than the number of the normal samples, the data collection module 121 may pre-process the defect samples in the data set (including the defect samples and the normal samples) collected by the data collection module 121. For instance, over-sampling, data synthesis, and synthetic minority oversampling technique (SMOTE), random sampling, or data augmentation, etc. may be performed to increase the amount of the training data, so that an updated data set may be generated based on the oversampled defect samples and normal samples. To be specific, the data collection module 121 may oversample the training data of the defect samples in response to a ratio of the defect samples to the normal samples being smaller than a threshold, so as to generate the updated data set. The training module 122 may train the neural network model according to the updated data set. The following table 4 and table 5 show the performance of the neural network model that is trained according to the training data shown in table 1 based on the single limit condition "minimum error rate" after the soldering defect samples in the table 1 are oversampled.

TABLE 4

| Overall accuracy (%) | Overall error rate (%) | Validation data as shown in table 1 Prediction of neural network model | | | |
|---|---|---|---|---|---|
| 98.31 | 1.69 | | Defect | Normal | Total | FNR (%): |
| True value | Defect | 5 | 0 | 5 | 0.00 |
| | Normal | 12 | 593 | 605 | TNR (%): |
| Total | | 17 | 593 | 610 | 98.02 |

TABLE 5

| Overall accuracy (%) | Overall error rate (%) | Test data shown in table 1 Prediction of neural network model | | | |
|---|---|---|---|---|---|
| 98.39 | 1.61 | | Soldering defect | Normal | Total | FNR (%): |
| | | | | | | 0.00 |
| True value | Soldering defect | 24 | 0 | 24 | |
| | Normal | 49 | 2972 | 3021 | TNR (%): |
| Total | | 73 | 2972 | 3045 | 98.38 |

As shown in table 4 and table 5, although the oversampling technique effectively reduces the FNR, it reduces the overall accuracy and increases the overall error rate.

In order to improve the overall performance (for example, including: the overall accuracy, the overall error rate, the FNR, and the TNR) of the neural network model, the training device 100 of the disclosure may selectively perform pre-processing on the defect samples in the data set. The pre-processing includes, for example, oversampling, data synthesis, SMOTE, random sampling, or data augmentation. Then, the training device 100 may select the neural network model capable of improving the overall performance according to a plurality of constraints. In the embodiment, the constraints may include a constraint $\alpha$ (or referred to as a "first constraint") and a constraint $\beta$ (or referred to as a "third constraint"). In an embodiment, the constraints may further include a constraint γ (or referred to as a "second constraint").

The constraint α is "the TNR is greater than 95", and the constraint β is "the value of the FNR is the minimum". For example, the training module 122 may select the first model set from plural models respectively corresponding to the iterations according to the constraint α. The first model set is composed of plural models with the TNRs greater than 95%. Next, the training module 122 may select the model with the lowest FNR from the first model set (i.e., the plural models complied with the constraint A) to act as the neural network model to be finally used according to the constraint β.

Since there may be plural models that are complied with the constraint α and the constraint β, the second model set selected by the training module 122 from the first model set according to the constraint β may include a plurality of second models complied with the constraint α (i.e., the TNR is greater than 95%) and the constraint β (i.e., having the lowest FNR). In order to find the optimal model to act as the neural network model to be finally used, the training module 122 may further filter the models in the second model set according to another constraint to find the neural network model to be finally used. In an embodiment, the training module 122 may select a specific model corresponding to the constraint γ or a target constraint from the second model set (i.e., the set of models that are complied with the constraint α and the constraint β) to act as the neural network model to be finally used according to the constraint γ or the target constraint. For example, it is assumed that the target constraint is the TNR, the training module 122 may select a specific model with the largest TNR from the second model set to act as the neural network model to be finally used, and the performance of the neural network model may be shown in the following table 6 and table 7.

TABLE 6

| Overall accuracy (%) | Overall error rate (%) | Validation data shown in table 1 Prediction of neural network model | | | |
|---|---|---|---|---|---|
| | | | Defect | Normal | Total | FNR (%): |
| 99.51 | 0.49 | | | | | |
| True value | Defect | 5 | 0 | 5 | 0.00 |
| | Normal | 3 | 602 | 605 | TNR (%): |
| Total | | 8 | 602 | 610 | 99.5 |

TABLE 7

| Overall accuracy (%) | Overall error rate (%) | Test data shown in table 1 Prediction of neural network model | | | |
|---|---|---|---|---|---|
| | | | Defect | Normal | Total | FNR (%): |
| 99.93 | 0.07 | | | | | |
| True value | Defect | 24 | 0 | 24 | 0.00 |
| | Normal | 2 | 3,019 | 3,021 | TNR (%): |
| Total | | 26 | 3,019 | 3,045 | 99.93 |

As shown in FIG. 6 and FIG. 7, although the TNR of the neural network model obtained based on a plurality of constraints (i.e., the constraint α "TNR is greater than 95%", the constraint β "having the lowest FNR", and the constraint γ "having the largest TNR" is slightly reduced (compared to the table 2 and table 3), but the FNR of the neural network model is decreased significantly. Favorable overall accuracy and overall error rate are provided as well. In other words, the neural network model trained by the training device 100 of the disclosure may achieve the favorable FNR, overall accuracy, and overall error rate by sacrificing considerably low TNR.

In another embodiment, the training module 122 may select a model corresponding to the last iteration among the iterations complied with the constraint γ from the second model set (i.e., the set of models complied with the constraint α and the constraint β) according to the constraint γ to act as the neural network model to be finally used. For example, it is assumed that the second model set includes a model I corresponding to the $10^{4th}$ iteration, a model J corresponding to the $10^{5th}$ iteration, and a model K corresponding to the $10^{6th}$ iteration. The training module may select the model K as the neural network model to be finally used in response to the last iteration corresponding to the model K.

In the embodiment, the data collection module 121 obtains the image data set related to the appearance of the PCB through the transceiver 130, and the training module 122 trains a neural network model that may be used to identify the type of the appearance defects of the PCB according to the image data set. Table 8 shows the numbers of samples of various types of defects in the aforementioned image data set related to the appearance of the PCB. The various types of defects may be associated with, for example, inclusion of solder mask (S/M), scratch of S/M, pollution of S/M, copper exposure of S/M, uneven printing of S/M, skip printing of S/M, poor developing, board damage of S/M, wetting of S/M, inclusion of S/M organic solderability preservative (OSP), oxidation of S/M OSP, pollution of PAD gold plating, oxidation of PAD gold plating, copper exposure of PAD gold plating, blur text, or wetting of PAD, but the disclosure is not limited thereto.

TABLE 8

Data set of 16 defects of PCB ($1^{st}$ fold of k-fold cross validation)

| Defect type | Training data | Validation data | Test data | Total |
|---|---|---|---|---|
| #00 inclusion (S/M) | 2,123 | 312 | 644 | 3,079 |
| #01 scratch (S/M) | 13,182 | 1,865 | 3,719 | 18,766 |
| #02 pollution (S/M) | 395 | 65 | 120 | 580 |
| #03 copper exposure (S/M) | 689 | 91 | 222 | 1,002 |
| #04 uneven printing | 377 | 51 | 109 | 537 |
| #05 SM skip printing | 299 | 35 | 70 | 404 |
| #06 poor developing | 817 | 120 | 229 | 1,166 |
| #07 board damage (S/M) | 1,453 | 216 | 412 | 2,081 |
| #08 wetting (S/M) | 370 | 54 | 113 | 537 |
| #09 PAD inclusion (OSP) | 2,254 | 335 | 631 | 3,220 |
| #10 PAD oxidation (OSP) | 2,557 | 351 | 729 | 3,637 |
| #11 PAD pollution(gold) | 3,444 | 480 | 1,002 | 4,926 |
| #12 PAD oxidation(gold) | 215 | 26 | 55 | 296 |
| #13 PAD copper exposure (gold) | 973 | 143 | 269 | 1,385 |
| #14 blur text | 302 | 47 | 86 | 435 |
| #15 PAD pollution (tin) | 1,577 | 241 | 454 | 2,272 |
| Total | 31,027 | 4,432 | 8,864 | 44,323 |

The following table 9 shows the performance of the neural network model trained according to the training data in table 8 based on the single constraint "minimum error rate" after oversampling the defect types having a small number of samples in table 8. As shown in table 9, an average error corresponding to the neural network model of table 9 is high (more than 5%), and the number of the defect types with error rates exceeding 10% is high (more than 4 defect types).

TABLE 9

| Fold number (k-fold cross validation) | Data set | Overall error rate (%) | Average error (%) | Number of defect types with error rates exceeding 10% | Number of defect types with error rates exceeding 40% |
|---|---|---|---|---|---|
| 1st fold | Validation data | 2.82 | 6.2 | 5 | 0 |
|  | Test data | 2.54 | 6.23 | 6 | 0 |
| 2nd fold | Validation data | 2.64 | 5.57 | 4 | 0 |
|  | Test data | 2.82 | 5.95 | 5 | 0 |
| 3rd fold | Validation data | 2.82 | 5.81 | 5 | 0 |
|  | Test data | 2.81 | 6.66 | 4 | 0 |

In order to improve the overall performance of the neural network model (for example: to reduce the number of the defect types with the average error and the error rate exceeding 10%), the training device 100 provided by the disclosure may selectively oversample the defect samples in the data set. Then, the training device 100 may select a neural network model that may improve the overall performance according to multiple constraints. In the embodiment, the multiple constraints include the constraint α and the constraint β. The constraint α is "the overall accuracy is greater than 95%", and the constraint β is "the average error is the lowest". For example, the training module 122 may select a first model set from a plurality of models respectively corresponding to the iterations according to the constraint α. The first model set is composed of a plurality of models with an overall accuracy greater than 95%. Then, the training module 122 may select a model with the lowest average error from the first model set (i.e., the models complied with the constraint α) according to the constraint β to act as the neural network model to be finally used. Since there may be multiple models that are complied with the constraint β, the second model set selected by the training module 122 from the first model set according to the constraint β may include a plurality of models that are complied with the constraint α (i.e., the overall accuracy is greater than 95%) and the constraint β (i.e., with the lowest average error).

In order to find the optimal specific model, the training module 122 may further filter the models in the second model set according to the constraint γ. In an embodiment, the training module 122 may select a specific model corresponding to a target condition from the second model set according to the constraint γ to act as the neural network model to be finally used. For example, it is assumed that the target condition is the overall accuracy, the training module 122 may select a specific model with the greatest overall accuracy from the second model set to act as the neural network model to be finally used. The performance of the neural network model is shown in table 10 as follows. As shown in table 10, indicators such as "average error" and "number of defect types with error rates exceeding 10%" are ameliorated.

TABLE 10

| Fold number (k-fold cross validation) | Data set | Overall error rate (%) | Average error (%) | Number of defect types with error rates exceeding 10% | Number of defect types with error rates exceeding 40% |
|---|---|---|---|---|---|
| 1st fold | Validation data | 3.54 | 4.56 | 1 | 0 |
|  | Test data | 3.83 | 5.16 | 2 | 0 |
| 2nd fold | Validation data | 3.72 | 4.54 | 3 | 0 |
|  | Test data | 4.51 | 5.49 | 3 | 0 |
| 3rd fold | Validation data | 4.17 | 4.81 | 2 | 0 |
|  | Test data | 4.23 | 4.68 | 2 | 0 |

In an embodiment, the data collection module 121 obtains the image data set related to the appearance of the DRAM through the transceiver 130, and the training module 122 trains a neural network model that can be used to identify the appearance defect types of the DRAM according to the image data set. Table 11, table 12, and table 13 show the numbers of samples of various types of defects in the aforementioned image data set related to the appearance of the DRAM. The various types of defects may be associated with, for example, scratch, arrow, particle, or discolor, but the disclosure is not limited thereto.

TABLE 11

Data set of 5 types of defects of DRAM
(1st fold of k-fold cross validation)

| Defect type | Training data | Validation data | Test data | Total |
|---|---|---|---|---|
| scratch | 1,266 | 181 | 362 | 1,809 |
| arrow | 3,250 | 465 | 929 | 4,644 |
| particle | 22,491 | 3,212 | 6,428 | 32,131 |

TABLE 11-continued

Data set of 5 types of defects of DRAM
(1st fold of k-fold cross validation)

| Defect type | Training data | Validation data | Test data | Total |
|---|---|---|---|---|
| discolor | 13,234 | 1,891 | 3,782 | 18,907 |
| normal | 48,668 | 6,951 | 13,907 | 69,526 |
| total | 88,909 | 12,700 | 25,408 | 127,017 |

TABLE 12

Data set of 5 types of defects of DRAM
(2nd fold of k-fold cross validation)

| Defect type | Training data | Validation data | Test data | Total |
|---|---|---|---|---|
| scratch | 1,271 | 176 | 362 | 1,809 |
| arrow | 3,262 | 453 | 929 | 4,644 |
| particle | 22,561 | 3,143 | 6,427 | 32,131 |
| discolor | 13,188 | 1,937 | 3,782 | 18,907 |
| normal | 48,627 | 6,991 | 13,908 | 69,526 |
| total | 88,909 | 12,700 | 25,408 | 127,017 |

TABLE 13

Data set of 5 types of defects of DRAM
(2nd fold of k-fold cross validation)

| Defect type | Training data | Validation data | Test data | Total |
|---|---|---|---|---|
| scratch | 1,270 | 177 | 362 | 1,809 |
| arrow | 3,278 | 436 | 930 | 4,644 |
| particle | 22,508 | 3,197 | 6,426 | 32,131 |
| discolor | 13,237 | 1,888 | 3,782 | 18,907 |
| normal | 48,616 | 7,002 | 13,908 | 69,526 |
| total | 88,909 | 12,700 | 25,408 | 127,017 |

The following table 14 shows the performance of the neural network model trained according to the training data of the table 13 based on the single constraint "minimum error rate". As shown in table 14, the error rate of the neural network model corresponding to table 13 is high when identifying scratches or arrows.

TABLE 14

| Fold number (k-fold cross validation) | Data set | Data set shown in table 11, table 12, table 13 | | |
|---|---|---|---|---|
| | | Overall error rate (%) | "scratch" error rate (%) | "arrow" error rate (%) |
| 1st fold | Validation data | 1.63 | 8.84 | 2.37 |
| | Test data | 1.52 | 8.84 | 1.83 |
| 2nd fold | Validation data | 1.51 | 6.82 | 1.32 |
| | Test data | 1.50 | 9.12 | 1.83 |
| 3rd fold | Validation data | 1.18 | 3.95 | 1.38 |
| | Test data | 1.58 | 8.84 | 1.61 |

In order to improve the overall performance of the neural network model (for example, the error rate of identifying scratches or arrows), the training device 100 provided by the disclosure may selectively oversample the defect samples in the data set. Thereafter, the training device 100 may select a neural network model that may improve the overall performance according to a plurality of constraints. Regarding the 5 types of defects of the DRAM, the scratch type and the arrow type are the types of defects that may affect the quality of the DRAM most significantly. As such, when the filtering constraints of the neural network model are set, the training module 121 may set the constraint (or the target condition) to be related to a specific type of defect (for example, scratch or arrow), and a single constraint may be associated with multiple defect types.

In the embodiment, the constraint $\alpha$ is "the overall accuracy is greater than 95%", and the constraint $\beta$ is "the error rates of scratch and arrow are the lowest". For example, the training module 122 may select the first model set from a plurality of models respectively corresponding to the iterations according to the constraint $\alpha$. The first model set is composed of plural models with overall accuracy greater than 95%. Next, the training module 122 may select the model with the lowest scratch error rate and arrow error rate from the first model set (i.e., the models complied with the constraint $\beta$) according to the constraint $\beta$ to serve as the neural network model to be finally used. Since there may be multiple models that are complied with the constraint $\beta$, the second model set selected from the first model set by the training module 122 according to the constraint $\beta$ may include several models that are complied with the constraint $\alpha$ (i.e., the overall accuracy is greater than 95%) and the constraint $\beta$ (i.e., having the lowest scratch error rate and arrow error rate). In order to find the optimal specific model, the training module 122 may further filter the models in the second model set according to the constraint $\gamma$.

In an embodiment, the training module 122 may select a specific model corresponding to the target condition from the second model set according to the constraint $\gamma$ to act as the neural network model to be finally used. For example, it is assumed that the target condition is the overall accuracy, the training module 122 may select a specific model with the greatest overall accuracy from the second model set to act as the neural network model to be finally used. The performance of the neural network model is shown in the following table 15.

TABLE 15

| Fold number (k-fold cross validation) | Data set | Data set shown in table 11, table 12, table 13 | | |
|---|---|---|---|---|
| | | Overall error rate (%) | "scratch" error rate (%) | "arrow" error rate (%) |
| 1st fold | Validation data | 3.04 | 3.87 | 0.65 |
| | Test data | 2.97 | 1.38 | 1.51 |
| 2nd fold | Validation data | 1.51 | 3.41 | 0.66 |
| | Test data | 1.59 | 6.35 | 1.18 |
| 3rd fold | Validation data | 3.13 | 1.13 | 0.69 |
| | Test data | 3.44 | 4.14 | 0.86 |

As shown in the table 14 and table 15, compared with the neural network model trained according to a single type of constraint, the neural network model trained according to a plurality of types of constraints significantly ameliorate the overall error rate, the error rate of the scratch type, and the error rate of the arrow type.

Figure 2:
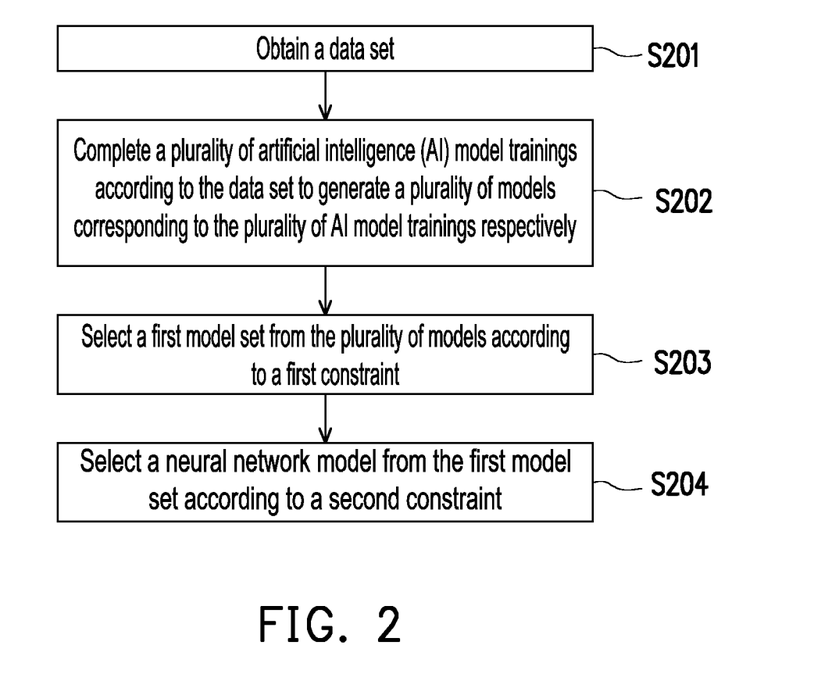
FIG. 2 is a flow chart illustrating a training method for a neural network model according to an embodiment of the disclosure.

FIG. 2 is a flow chart illustrating a training method for a neural network model according to an embodiment of the disclosure. The training method may be implemented by the training device 100 shown in FIG. 1. In step S201, a data set is obtained. In step S202, a plurality of artificial intelligence (AI) model trainings are completed according to the data set to generate a plurality of models corresponding to the plurality of AI model trainings respectively. In step S203, a first model set is selected from the plurality of models according to a first constraint. In step S204, a neural network model is selected from the first model set according to a second constraint.

In an embodiment, any of the constraints mentioned in the disclosure may be generated by an external electronic device. The processor 110 may obtain the constraints from the external electronic device through the transceiver 130.

In an embodiment, any of the constraints mentioned in the disclosure may be generated by an operation of the user. For example, a user may perform an operation on the GUI 140, and the GUI 140 may generate a constraint corresponding to the operation. After generating the constraint, the GUI 140 may transmit the constraint to the processor 110.

In view of the foregoing, the training device of the disclosure may use a variety of constraints to select a model that satisfies application needs and improve various indicators of identification performance (for example, any indicator related to the confusion matrix) from a plurality of models corresponding to a plurality of iterations to act as the neural network module to be finally used.

What is claimed is:

1. A training device for a neural network model, comprising:
a transceiver;
a storage medium, storing a plurality of modules; and
a processor, coupled to the storage medium and the transceiver, and accessing and executing the plurality of modules, wherein the plurality of modules comprise:
a data collection module, obtaining a data set through the transceiver; and
a training module, completing a plurality of artificial intelligence (AI) model trainings according to the data set to generate a plurality of models corresponding to the plurality of AI model trainings respectively, selecting a first model set from the plurality of models according to a first constraint, and selecting the neural network model from the first model set according to a second constraint, wherein the first constraint is a first indicator of a confusion matrix and the second constraint is a second indicator of the confusion matrix, wherein the first constraint is different from the second constraint wherein the data collection module receives defect samples and normal samples through the transceiver and oversamples the defect samples to generate the data set in response to a ratio of the defect samples to the normal samples being less than a threshold.

2. The training device as claimed in claim 1, wherein the training module selects a second model set from the first model set according to a third constraint and selects the neural network model from the second model set according to the second constraint.

3. The training device as claimed in claim 1, wherein the training module selects the neural network model corresponding to a target condition from the first model set according to the second constraint.

4. The training device as claimed in claim 1, wherein the training module selects the neural network model corresponding to the last iteration among the iterations of AI model training complied with the second constraint from the first model set according to the second constraint.

5. The training device as claimed in claim 1, wherein the first constraint and the second constraint are associated with at least one of: a true negative rate (TNR), a true positive rate (TPR), a false negative rate (FNR), a false positive rate (FPR), a minimum error rate, an average error rate, a recall rate, or accuracy.

6. The training device as claimed in claim 1, wherein the neural network model comprises an autoencoder neural network, a deep learning neural network, a deep residual learning neural network, and a restricted Boltzmann machine neural network, a recursive neural network, or a multilayer perception neural network.

7. The training device as claimed in claim 1, wherein the data set is associated with an appearance of a printed circuit board, and the defect samples are associated with at least one of: inclusion of solder mask (S/M), scratch of S/M, pollution of S/M, copper exposure of S/M, uneven printing of S/M, skip printing of S/M, poor developing, board damage of S/M, wetting of S/M, inclusion of S/M organic solderability preservative (OSP), oxidation of S/M OSP, pollution of PAD gold plating, oxidation of PAD gold plating, copper exposure of PAD gold plating, blur text, wetting of PAD or normal.

8. The training device as claimed in claim 1, wherein the data set is associated with an appearance of a semiconductor manufacturing wafer, and the defect samples are associated with at least one of: scratch, arrow, particle, discolor, or normal.

9. The training device as claimed in claim 1, further comprising:

a graphical user interface, coupled to the processor, wherein the processor obtains the first constraint and the second constraint through the graphical user interface.

10. A training method for a neural network model, comprising:
obtaining a data set, comprising: receiving defect samples and normal samples and oversampling the defect samples to generate the data set in response to a ratio of the defect samples to the normal samples being less than a threshold;
completing a plurality of artificial intelligence (AI) model trainings according to the data set to generate a plurality of models corresponding to the plurality of AI model trainings respectively;
selecting a first model set from the plurality of models according to a first constraint; and
selecting the neural network model from the first model set according to a second constraint,
wherein the first constraint is a first indicator of a confusion matrix and the second constraint is a second indicator of the confusion matrix, wherein the first constraint is different from the second constraint.

11. The training method as claimed in claim 10, wherein the step of selecting the neural network model from the first model set according to the second constraint comprises:
selecting a second model set from the first model set according to a third constraint and selecting the neural network model from the second model set according to the second constraint.

12. The training method as claimed in claim 10, wherein the step of selecting the neural network model from the first model set according to the second constraint comprises:
selecting the neural network model corresponding to a target condition from the first model set according to the second constraint.

13. The training method as claimed in claim 10, wherein the step of selecting the neural network model from the first model set according to the second constraint comprises:
selecting the neural network model corresponding to the last iteration among the iterations of AI model training complied with the second constraint from the first model set according to the second constraint.

14. The training method as claimed in claim 10, wherein the first constraint and the second constraint are associated with at least one of: a true negative rate (TNR), a true positive rate (TPR), a false negative rate (FNR), a false positive rate (FPR), a minimum error rate, an average error rate, a recall rate, or accuracy.

15. The training method as claimed in claim 10, wherein the neural network model comprises an autoencoder neural network, a deep learning neural network, a deep residual learning neural network, and a restricted Boltzmann machine neural network, a recursive neural network, or a multilayer perception neural network.

16. The training method as claimed in claim 10, wherein the data set is associated with an appearance of a printed circuit board, and the defect samples are associated with at least one of: inclusion of solder mask (S/M), scratch of S/M, pollution of S/M, copper exposure of S/M, uneven printing of S/M, skip printing of S/M, poor developing, board damage of S/M, wetting of S/M, inclusion of S/M organic solderability preservative (OSP), oxidation of S/M OSP, pollution of PAD gold plating, oxidation of PAD gold plating, copper exposure of PAD gold plating, blur text, wetting of PAD, or normal.

17. The training method as claimed in claim 10, wherein the data set is associated with an appearance of a semiconductor manufacturing wafer, and the defect samples are associated with at least one of: scratch, arrow, particle, discolor, or normal.

18. The training method as claimed in claim 10, further comprising:
obtaining the first constraint and the second constraint through a graphical user interface.

* * * * *